United States Patent [19]

Gladman

[11] Patent Number: 4,843,828

[45] Date of Patent: Jul. 4, 1989

[54] LIQUID-VAPOR CONTACT METHOD AND APPARATUS

[75] Inventor: David C. F. Gladman, Toddington, England

[73] Assignee: The BOC Group, plc, Windlesham, England

[21] Appl. No.: 183,470

[22] Filed: Apr. 15, 1988

Related U.S. Application Data

[63] Continuation of Ser. No. 914,389, Oct. 2, 1986, abandoned.

[30] Foreign Application Priority Data

Oct. 4, 1985 [GB] United Kingdom ............... 8524598
Sep. 12, 1986 [GB] United Kingdom ............... 8622056

[51] Int. Cl.⁴ .................................................. F25J 3/02
[52] U.S. Cl. ........................................ 62/24; 62/27; 62/31; 62/32; 62/40
[58] Field of Search ............... 62/9, 11, 22, 23, 24, 62/27, 28, 31, 32, 33, 34, 40; 203/98

[56] References Cited

U.S. PATENT DOCUMENTS

| | | | |
|---|---|---|---|
| 2,812,645 | 11/1957 | Locklair et al. | 62/123 |
| 3,751,933 | 8/1973 | Balabaev et al. | 62/22 X |
| 2,769,321 | 11/1956 | Stiles | 62/28 |
| 4,025,398 | 5/1977 | Haselden | 203/25 |
| 4,152,129 | 5/1979 | Trentham et al. | 62/18 |
| 4,230,469 | 10/1980 | Grimm et al. | 62/28 |
| 4,273,566 | 6/1981 | Schwarz | 62/27 |
| 4,444,576 | 4/1984 | Ryan et al. | 62/28 X |
| 4,464,188 | 8/1984 | Agrawal et al. | 62/31 X |
| 4,599,096 | 7/1986 | Burr | 62/33 X |

FOREIGN PATENT DOCUMENTS

0119613 9/1984 European Pat. Off. .
2202206 7/1973 Fed. Rep. of Germany .
514588 3/1921 France .

OTHER PUBLICATIONS

Flower, "Energy Conservation and Medium Purity Oxygen", 1. Chem. E. Symposium Series, No. 79, pp. F5–F14.

Haselden, "An Approach to Minimum Power Consumption in Low Temperature Gas Separation," Trans. Instn. Chem. Engrs., vol. 36, (1958), pp. 8 and 124–132.

Flower et al., "Medium Purity Oxygen Production and Reduced Energy Consumption in Low Temperature Distillation of Air", AICHE Symposium Series, No. 224, (1938), pp. 4–11.

Flower et al., "Medium Purity Oxygen Production and Its Uses in Energy Conversion", International Congress of Refrigeration Proceedings, vol. 1, (1979), pp. 409–419.

Primary Examiner—Ronald C. Capossela
Attorney, Agent, or Firm—Carol A. Nemetz; R. Hain Swope; L. R. Cassett

[57] ABSTRACT

In a distillation column used in the separation of air, a liquid stream of composition intermediate those occurring at the top and bottom is taken from the column and is at least partial reboiled in an external heat exchanger by heat exchange with a heat exchange fluid. The resultant vapor is returned to the column. Its composition matches that of the vapor in the vapor space to which it is returned more closely than that of the vapor in the vapor space above the tray from which the liquid is taken for reboil. The heat exchange fluid is other than one which is taken from a liquid vapor contact column, is passed directly to the heat exchanger, and is then returned directly to the column from which it was taken. The distillation column is preferably the lower pressure column of a double column system, and the heat exchange fluid is preferably air which preferably condenses in the heat exchanger and is introduced into the column at a level above that from which the liquid stream of intermediate composition is taken.

11 Claims, 8 Drawing Sheets

LOST WORK

SEPARATION WORK

LIQUID-VAPOR CONTACT METHOD AND APPARATUS

This is a continuation of application Ser. No. 914,389 filed Oct. 2, 1986, now abandoned.

BACKGROUND OF THE INVENTION

This invention relates to a liquid-vapor contact method and apparatus.

It is particularly concerned with the conduct of operations such as distillation in which a boiling liquid phase comprising two or more component is contacted intimately and undergoes mass exchange with condensing vapor phase comprising said two or more components.

Distillation is conventionally conducted substantially adiabatically: all the requirements of the distillation column for the addition of heat are met by adding the necessary heat to the region of the column where the highest temperature obtains, and all the requirements of the column for the removal of heat are met by extracting heat from a region of the column where the lowest temperature obtains. Thus, a distillation column is typically provided at its bottom with a boiler and at its top with a condenser or a source of reflux.

The higher the temperature of a reservoir to which heat is to be supplied, or the lower the temperature of a reservoir from which heat is to be extracted, the greater the amount of work that has to be done in supplying or extracting the heat as the case may be. It has thus been known for a long time as a theoretical proposal that the thermodynamic efficiency of a distillation can be increased by adding the necessary heat to the distillation column at several locations at different temperatures from one another, and by similarly extracting heat from the column at several locations of differing temperature.

In "An Approach to Minimum Power Consumption in Low Temperature Gas Separation", Trans Instn Chem Engrs, Vol 36, 1958, G. G. Haselden identifies the irreversibility of the distillation columns as a key source of inefficiency in the operation of cryogenic air separation processes. It is pointed out in this paper that because of the change of slope of the reboil requirement curve in the lower part of an air sepration column occuring at a vapor composition of about 50% oxygen, it is possible to make a simple approach towards ideal column operation by adding about half the reboil heat at a single level in the column a little below the feed, say at a temperature of 88K, the remaining half being added at the terminal temperature of 92.7K. It is further observed that any practical attempt to approach ideal non-adiabatic column operation by the use of distributed heating and cooling sources operating over extended zones of the column will be most effective for moderate product purities. A cycle is proposed utilizing the column operating principles identified in the aforesaid paper. Even with the use of an auxiliary column, forty percent of the oxygen is produced at medium purity.

In U.S. Pat. No. 4,025,398 (G. G. Haselden), it is proposed that two distilling systems be arranged to interchange heat with each other in order to achieve a close approach to the kind of thermodynamic ideal discussed hereinabove. One distilling system comprises a first column having a rectifying section in which there are varying amounts of reflux, and a second column having a stripping section in which there are varying amounts of reboil. Thermal linkage between the two columns is provided by taking vapor from the variable reflux column, partially condensing it in the stripping column, and returning the resulting liquid-vapor mixture to the variable reflux column. The partial condensation takes place in passages formed in distillation trays of the stripping column. Heat is thus extracted from the stripping column and is transferred to the variable reflux column. In the drawings accompanying the aforesaid U.S. patent specification, four trays are shown provided with such heat exchange pasages and hence there are four associated liquid outlets from the variable reflux column and four associated inlets to the variable reflux column for the liquid vapor mixture that is formed by partial evaporation of the liquid in the heat exchanger passages.

The streams of vapor are taken from the variable reflux column just below the level of chosen trays and the liquid-vapor mixture is returned to the column just above the respective trays. Although the proposals in U.S. Pat. No. 4,025,398 represent an advance in the art, difficulties arise in fabricating a distillation system in accordance therewith to operate at cryogenic temperatures. First, it is not easy to provide a piece of apparatus that can function adequately as both a distillation tray and as a heat exchanger to enable the partial condensation of the vapor from the variable reflux rectifier to be effected. Moreover, in a practical distillation system operating at cryogenic temperatures a large number of trays are typically required. In order to approach the thermodynamic ideal set out in U.S. Pat. No. 4,025,398 with such a system, it becomes necessary to provide a multiplicity of passages extending from the variable reflux rectifier to a large number of heat exchangers in the stripping column and a further multiplicity of passages for returning the resulting liquid-vapor mixture to the variable reflux column.

The use to produce oxygen of the process described is U.S. Pat. No. 4,025,398 is discussed in "Energy Conservation and Medium Purity Oxygen", J. R. Flower, 1. Chem E Symposum Series No. 79, pp F5-F14. The process is summarized in this paper as involving the taking of a number of vapor sidestreams from a first column and condensing them in heat transfer baffle elements immersed in the two phase mixtures on selected distillation stages of the second column. The condenser products would pass back to stages in the first column where the compositions matched. From analysis of this cycle, it was found that the advantages of distribution of heat flux decreased sharply as the product (oxygen) purity changed from 95 to 99% and that the critical part of the design involved the matches at the base of the second column for liquid (oxygen) compositions greater than 85%. It is therefore concluded that the cycle is primarily of use in producing medium purity oxygen. It is further reported that in the absence of suitable heat transfer baffles, more recent work has employed a series of reboiler—condensers situated between the first and second columns, each fed by a separate vapor sidestream and a separate liquid sidestream. The condenser products and evaporator products are returned to the first and second columns. It is reported that the advantages of using such existing heat exchange equipment are offset by a requirement for higher air feed pressures partly as a result of liquid hydrostatic effects.

It can therefore be seen that these existing proposals for distributing the necessary heat and refrigeration over a distillation column generally require a multiplicity of links between a pair of columns, and in the example of the production of oxygen are not effective to produce high purity oxygen. In general, the industrial demand for high purity oxygen is far greater than that for so-called medium purity oxygen. Moreover, when medium purity oxygen is produced, it is generally not possible to obtain in the distillation system a sufficient local concentration of argon to justify the inclusion of an additional column to produce pure argon.

Our analysis of the distillation of air shows that disproportionately more work needs to be in producing a given percentage change in a composition containing less than 80% nitrogen than in one containing more than 80% nitrogen. Accordingly, in air separation there is a greater need for reboiling of compositions intermediate air and pure oxygen than there is for condensation of compositions intermediate air and pure nitrogen. This appreciation of the relative merits of 'intermediate' reboil and 'intermediate' condensation is not shown in the prior art. Indeed, we have noted two prior proposals, U.S. Pat. No. 2,812,645, and German Pat. No. 2,202,206, which disclose an intermediate condensation step but not an intermediate reboiling step.

GENERAL DESCRIPTION OF THE INVENTION

It is an aim of the present invention to provide a method and apparatus for distilling air in which heat is supplied to or a distillation column at one or more intermediate locations within the column and whicn make possible a reduction in the disadvantages associated with the aforementioned prior processes involving multiple links between a pair of columns, and an improvement in the overall efficiency with which the air is separated, while making possible the production of an argon product and a relatively pure oxygen product.

According to the present invention there is provided a method of distilling air in at least one liquid vapor contact column in which a boiling liquid phase comprising a mixture of oxygen, nitrogen and argon is contacted intimately and undergoes mass exchange with a condensing vapor phase comprising oxygen, nitrogen and argon, said method including the steps of:

(i) providing reboil at a bottom region and reflux at a top region of a first liquid vapor contact column;

(ii) taking from a chosen level in the first column at least one liquid stream out of mass exchange relationship with vapor, said stream having a composition intermediate the extremes of composition that obtain in the column;

(iii) heat exchanging said at least one liquid stream of intermediate composition with a heat exchange fluid in a region external to the column so as to boil at least part of the stream, said heat exchange fluid flowing along a path other than one in which it passes directly from one liquid-vapor contact column, undergoes phase change in heat exchange relationship with said intermediate composition stream, and returns directly to the same column; and (iv) returning at least one stream of the boiled liquid to said first column or to another liquid-vapor contact column.

wherein:

the composition of the said returning stream matches more closely the composition of fluid of vapor at or adjacent the column level where said stream is returned than it does the composition of the mass exchange relationship with the liquid at said chosen level from which said at least one liquid stream is taken.

The invention also provides apparatus for distilling air, comprising a first one liquid-vapor contact column in which, in use, a boiling liquid phase comprising oxygen, nitrogen and argon is contacted intimately and undergoes mass exchange with a condensing vapor phase comprising oxygen, nitrogen and argon, said first column having at least one outlet passage at a chosen level for the withdrawal of a liquid stream of composition intermediate the extremes of composition that obtain in the column, in use, and communicating with heat exchange means operable to boil at least part of said stream by heat exchange with heat exchange fluid, wherein the said heat exchange means is external to the column and is in communication with said column or another liquid-vapor contact column at a level such that a stream of boiled liquid mixes with vapor and such that the composition of the returning stream matches more closely the composition of the vapor with which it is mixed, in use, than it does the composition of the vapor in mass exchange with the liquid at said chosen level, there being a path, for the flow of said heat exchange fluid other than one in which, in use, the heat exchange fluid passes directly from one liquid-vapor contact column, undergoes phase change in heat exchange relationship with said intermediate composition stream, and returns directly to the same column.

By avoiding the use of thermal links, of the kind described in some of the aforementioned prior documents, between intermediate levels of relatively high and low pressure columns, it becomes possible to attain useful power savings while at the same time producing pure product or products in the columns.

Preferably, no more than two liquid streams of intermediate composition are taken for boiling from any one column.

More preferably, only one liquid stream of intermediate composition is taken for boiling from any one column. It is thus possible to keep down the number of additional pipes into and out of the distillation columns and it is not necessary to use the large number of additional inlets and outlets to the columns that are shown in the drawings accompanying U.S. Pat. No. 4,025,398.

The invention is based in part on three discoveries. First, it is possible to obtain a closer approach to reversibility when heat is transferred to a stream of intermediate composition that is taken from a column at one level and returned thereto at another suitable level than when heat is merely transferred to or from the column at said one level. Second, in order to reduce the amount of irreversibility involved in the liquid-vapor contact operation, it is desirable that the composition of the boiled stream matches more closely the composition of the vapor to which it is returned than it does the vapor in mass-exchange relationship with the liquid from which it is taken. Third, greater benefit in terms of reducing irreversibilities can be gained when liquid taken for phase change appreciably differs in composition from vapor passing out of mass exchange relationship therewith (i.e. the rate of change of composition is at or near a maximum).

The method according to the invention is particularly suited for use in improving the efficiency with which the lower pressure column of a double column system operates. The said liquid stream of intermediate composition is in such examples preferably taken from the lower pressure column and returned thereto after being boiled. A tangible benefit from the increase in efficiency can be gained by increasing the proportion of air that is introduced directly into the lower pressure column, thus enabling the specific power consumption of the air separation to be decreased from levels associated with comparable conventional processes. Particularly, in the event that a stream relatively rich in argon (compared to the argon content of air) is withdrawn from the low pressure column to enable a relatively pure argon product to be produced in a further column, air is preferably introduced into the lower pressure column in liquid state. Such an expedient helps to maintain in the low pressure column liquid-vapor ratios adequate for recovery of argon. An alternative to the provision to the low pressure column of air in the liquid state is to withdraw a vapor-stream of intermediate composition from the lower pressure column, condense it, and return a stream of condensate to the column. In the event that the lower pressure column is employed in the production of a gaseous oxygen product, a relatively impure nitrogen stream (typically a waste stream), a gaseous nitrogen product, the liquid air is preferably introduced into the column at a level below that of the impure or waste nitrogen withdrawal but above that at which oxygen-rich fluid is fed into the lower pressure column from the bottom of the higher pressure column.

The heat exchange fluid may be taken from the overall process cycle in which the said liquid-vapor contact column or columns are operated. If desired, the heat exchange fluid may have more than one component and it may comprise the same components as the liquid to be boiled thereby. In the example of air separation in a double column, the heat exchange fluid may be taken from the higher pressure column but is not returned thereto. In some examples, however, it is preferred that said heat exchange fluid comprises a stream of air which downstream of its heat exchange with the liquid stream of intermediate composition is introduced into the lower pressure column typically in its liquid state. Upstream of its heat exchange with the stream of liquid of intermediate composition, the stream of air is preferably expanded in a turbine from a pressure above that at which the lower pressure column operates (e.g. from a pressure in the order of that at which the higher pressure column operates, such that it can be taken from the main stream of air entering the higher pressure column). The air preferably enters the lower pressure column at its dew point. In the event that the air leaves the expansion turbine at a temperature above its dew point it may be reduced in temperature by heat exchange upstream of its heat exchange with the liquid of intermediate composition. Downstream of its heat exchange with the liquid of intermediate composition, the air stream is preferably passed through a throttling valve prior to its introduction into the lower pressure column.

It is not essential to the method according to the present invention that the heat exchange between the intermediate composition stream and the heat exchange fluid be effective to boil all the stream. When there is incomplete phase change, the resulting liquid-vapor bi-phase may be separated into liquid and vapor, and a stream of the boiled fluid returned to the first column in accordance with the invention. The remaining liquid, is desirably passed into liquid in a column forming part of the apparatus according to the invention.

Alternatively, the resulting liquid-vapor biphase is not separated but is returned to a chosen column at a chosen level in accordance with the invention. As another alternative, instead of returning the residual liquid to a liquid-vapor contact column, it may be subjected to further heat exchange in order to complete the phase change. The vapor produced as a result of such further heat exchange has a composition different from that of the vapor produced as a result of the first heat exchange. Accordingly, it is typically returned to liquid-vapor contact column forming part of said apparatus and introduced into vapor having a similar composition.

Typically, the or each liquid stream of intermediate composition taken from a chosen level for reboiling comprises from 20 to 50% by volume of the liquid flow at that level.

BRIEF DESCRIPTION OF THE DRAWINGS

The method and apparatus according to the invention will now be described by way of example with reference to the accompanying drawings, in which.

DETAILED DESCRIPTION OF THE INVENTION

Figure 1:
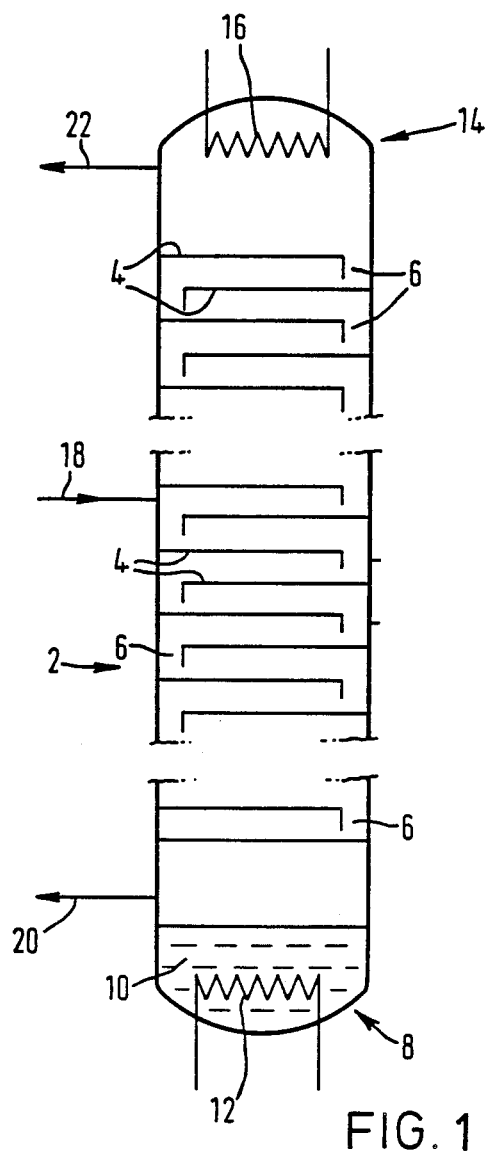
FIG. 1 is a schematic drawing illustrating a conventional distillation column on which the lower pressure column of a double column used in the separation of air may be based.

In the drawings, like parts are referred to by the same reference numerals. Referring to FIG. 1 of the accompanying drawings, there is shown a distillation column 2 for the fractional separation of a fluid comprising two or more components. The column 2 has disposed therein an appropriate number of horizontal, spaced, liquid-vapor contact trays 4 for effecting the separation of the fluid mixture entering the column into a liquid fraction rich in a less volatile component or components of the fluid, and a vapor fraction rich in a more volatile component or components of the fluid mixture. The trays 4 may be of any conventional kind, for example, sieve trays or bubble-cap trays, and each tray communicates with the tray below by means of downcomer 6 so that in operation of the column 2 there is a flow of liquid from tray-to-tray down the column. The liquid-vapor contact trays 4 each have vapor passages (not shown) formed therethrough, whereby vapor ascending the column is able to pass through the liquid on each tray and thus come into mass (and temperature) exchange relationship therewith. In order to provide upward flow of vapor through the column, the column 2 is provided with a reboiler 8 at its bottom comprising a reservoir 10 for liquid collecting at the bottom of the column and a heat exchange coil 12 through which a heat exchange fluid may be passed to boil the liquid in the reservoir 10.

Although the reboiler 8 is shown as being located within the column 2, it is possible to have an external boiler to which liquid collecting at the bottom of the column is passed and from which resultant vapor is returned to the column.

In order to provide a flow of liquid down the column, the column 2 is provided at its top with a condenser 14 comprising one or more heat exchange passages 16 through which an appropriate heat exchange fluid is passed and over which vapor rising to the top of column 2 flows, the heat exchange fluid effecting condensation of vapor. Thus, cooling is provided to the condenser 16 at the top of the column and heat to the boiler 8 at the bottom of the column.

Relatively cold liquid flows down the column and comes into contact with relatively warm vapor ascending the column. The liquid as it flows down the column thus becomes gradually warmer and richer in a less volatile component(s) of the fluid entering the column while the vapor ascending the column becomes gradually colder and richer in the more volatile component or component(s) of the fluid.

Instead of employing a condenser 14 within the column 2, an external condenser may be employed. Such an external condenser would receive vapor from the top of the column and return liquid thereto. It is also possible instead of employing a condenser, to introduce a liquid rich in said volatile component or components into the column from a separate source thereof so as to provide the necessary liquid reflux for the column 2. The column 2 has an inlet 18 for fluid to be fractionated therein. The fluid may be introduced into the column as vapor, as liquid, or as a liquid-vapor bi-phase. If the fluid is introduced into the column as liquid, its composition is matched to that of the liquid on the distillation tray 4 that it first encounters. Similarly, if the fluid is introduced into the column as a vapor, then its composition is approximately matched with that of the vapor in the column it first encounters. If introduced into the column 2 as a liquid-vapor bi-phase, the compositions of the liquid and vapor phases match those of the liquid on and the vapor above the tray onto which the liquid phase is introduced.

The distillation column 2 is provided with at least two outlets for product. Typically, there is an outlet 20 communicating with the liquid or vapor phase of the fraction collecting at the bottom of the column in the re-boiler 8 and an outlet 22 for the fraction collecting at the top of the column 2. The outlet 22 may receive liquid or vapor.

A heat pump cycle (not shown) may be employed to provide the necessary heating for the reboiler 8 and the necessary cooling for the condenser 14. Alternatively, other means of heating and cooling may be provided for the re-boiler 8 and the condenser 14.

Figure 2:
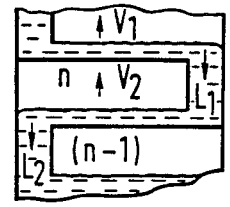
FIG. 2 is a schematic diagram illustrating the mass exchange that takes place on two adjacent trays of the column shown in FIG. 1.

In FIG. 2, two communicating trays $(n-1)$ and n are shown. On these two trays mass exchange takes place between liquid and vapor. FIG. 2 shows vapor $V_1$ and liquid $L_1$ passing out of mass exchange relationship with one another from tray n. Liquid $L_1$ flows through the downcomer onto tray $(n-1)$ where it comes into contact with vapor ascending from the tray below tray $(n-1)$. As a result, a liquid $L_2$ leaves the tray $(n-i)$ and a vapor $V_2$ ascends to tray n. In the context of this specification we refer to the vapor $V_1$ as "corresponding" with the liquid $L_1$. For a theoretical tray, $V_1$ is in equilibrium with $L_1$ and $V_2$ is in equilibrium with $L_2$. At minimum reflux the composition of $L_1$ approaches that of $L_2$ and the composition of $V_2$ approaches that of $V_1$. The part of the equilibrium line from the bottom of the column shown in FIG. 1 to the feed point for an oxygen-nitrogen system is represented in the McCabe-Thiele diagram in FIG. 3.

In practice, such minimum reflux conditions are not achievable throughout the column. Irreversible work is thus entailed in mixing liquid with vapor on each tray. Referring again to FIG. 3, the operating line AB thus follows a different path from the equilibrium line. Both lines do however pass through the origin as no nitrogen is removed with the oxygen at the bottom of the column. It is a general principle that as the operating line approaches the equilibrium line, the column approaches reversibility at that point since there are only minute changes in composition between communicating trays, and hence losses arising from mixing streams of different composition are minimized. It can be seen from FIG. 3 that between the feed point B and the bottom of the column (point A, where pure oxygen is produced) the operating line diverges considerably from the equilibrium line. Considerable irreversible work of mixing is thus entailed. The total amount of irreversible work (ignoring pressure drop) done in operating the column shown in FIG. 1 is represented by the cross-hatched are in FIG. 4. The area of the grap below the cross-hatched area represents the reversible work of separating oxygen from nitrogen. The abscissa in FIG. 4 can be plotted in terms of the liquid phase, or the vapor phase, or both.

Suppose some external heat is provided on tray n within three trays below the level of the feed and where the difference between the proportion of the nitrogen in the vapor phase $V_1$ and the proportion of the nitrogen in the liquid phase $L_1$ (see FIG. 2) is relatively large compared with other regions of the column below the feed.

Figure 5:
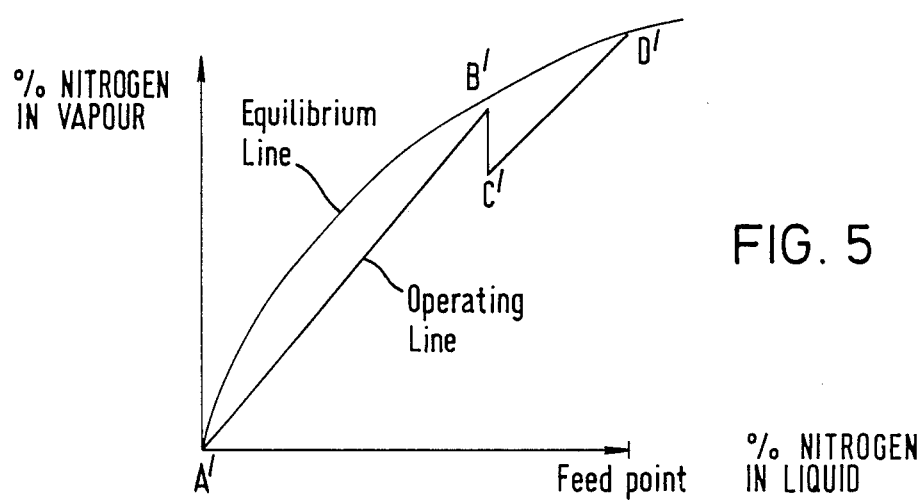
FIG. 5 is another McCabe-Thiele diagram representing operation of the column shown in FIG. 1 to separate a binary mixture of oxygen and nitrogen, but with additional heat being supplied to one tray of the column below the feed level.
Figure 6:
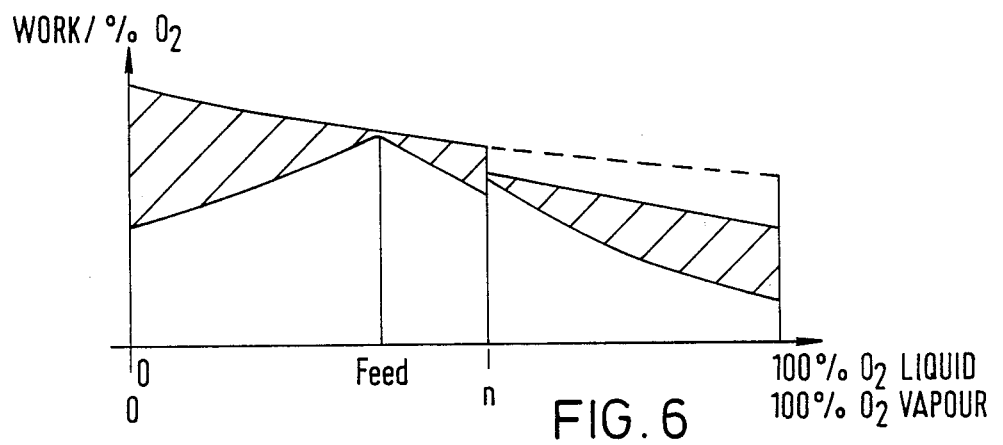
FIG. 6 is a graph representing the irreversibilities (excluding pressure drop) entailed in operating the column shown in FIG. 1 along the operating line A'B'C'D' of FIG. 5.

As shown in FIG. 5, by supplying an appropriate amount of heat, the operating line can be "lifted" at the level of tray n back to near the equilibrium line. Part $A'B'$ of the line passes through the origin as a pure oxygen product is obtained at the bottom of the column. Since providing extra heat at the level of the tray n does not change the mass flux on that part of the column, the slope of the other part C'D' is such that if it were extended downwards it would also pass through the origin. The result therefore of providing heat at the level of tray n is that the irreversible work of mixing in that part of the column below tray n is reduced while that above tray n remains unaltered. This fact is illustrated in FIG. 6 in which the cross-hatched area should be compared with the corresponding area in FIG. 4.

Figure 7:
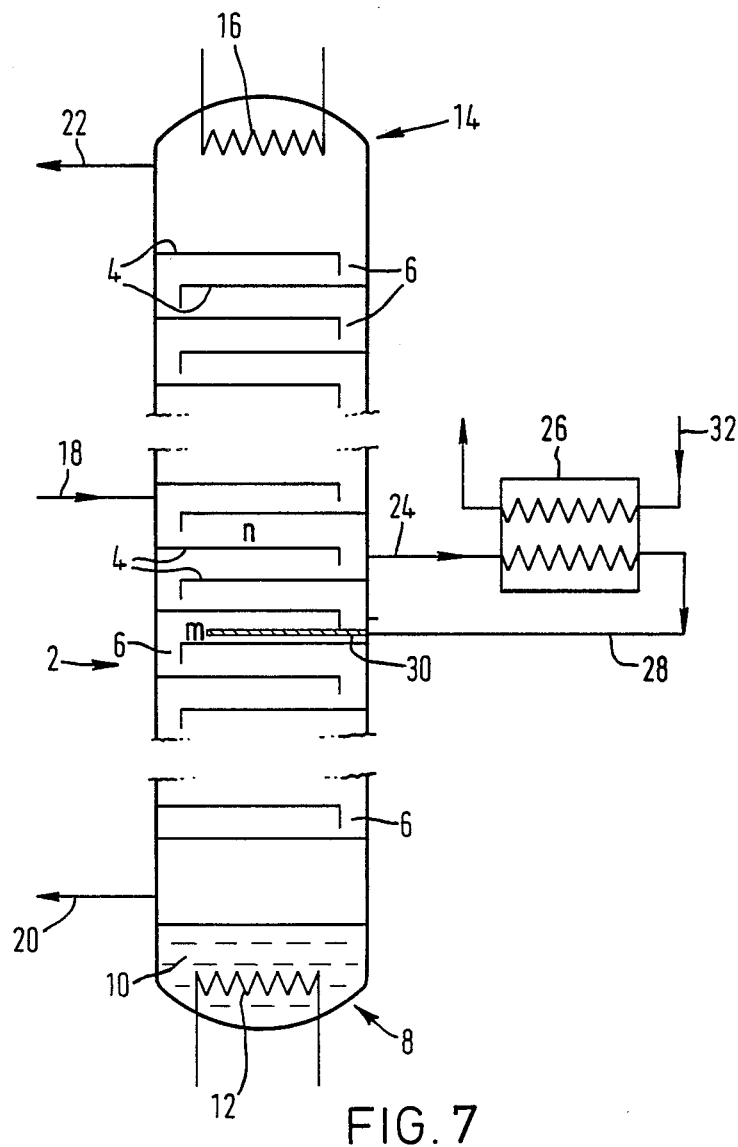
FIG. 7 is a schematic drawing illustrating a distillation column similar to that shown in FIG. 1 provided with means for reboiling a liquid stream of intermediate composition.

In order to improve upon the column shown in FIG. 1 with or without the application of external heat at said tray n, FIG. 7 shows a modified column for use in accordance with the invention, in association with which there is provided a conduit 24 having one end communicating with a chosen downcomer 6 of the column 2 and its other end terminating in one end of a heat exchange pass of a heat exchanger 26. The other end of the pass communicates with a second conduit 28 which terminates in a distributor 30 located above a chosen tray m in the column 2 such that fluid exiting the distributor 30 enters the vapor phase above that tray. The other pass of the heat exchanger 26 communicates with a stream 32 of heat exchange fluid effective to vaporize all the liqud passing therethrough. This stream 32 flows in a circuit other than one in which it is taken from the column (or another columns), is changed in phase in the heat exchanger 26, and is returned to the same column from which it is taken. Just fluid in the vapor phase is returned to the column through the distributor 30. In all other respects, the column shown in FIG. 7 is identical to that shown in FIG. 1.

The position in the column from which liquid is taken for boiling in the heat exchanger 26, and the position in the column to which the reboiled liquid is returned are selected so as to reduce the irreversibility of the column. The liquid is taken from the downcomer conducting liquid from tray n to tray (n−i) at a region where the difference between the proportion of nitrogen in said liquid and the (average) proportion of said component in the vapor phase leaving the surface of the liquid on said tray n is relatively large compared with other regions of the column.

Typically, in a column such as that shown in FIG. 7, which is employed to produce a bottom fraction comprising substantially pure oxygen and a top fraction comprising substantially pure nitrogen, the tray n is close to but below the level of the feed 18. The vapor formed in the heat exchanger 26 is returned to the column through the distributor 30 at a level in the vapor space immediately above a tray in such that the composition of the vapor formed in the heat exchanger 26 matches more closely that of the vapor leaving the liquid surface on the tray m that it does leaving the liquid surface on the tray n.

Figure 8:
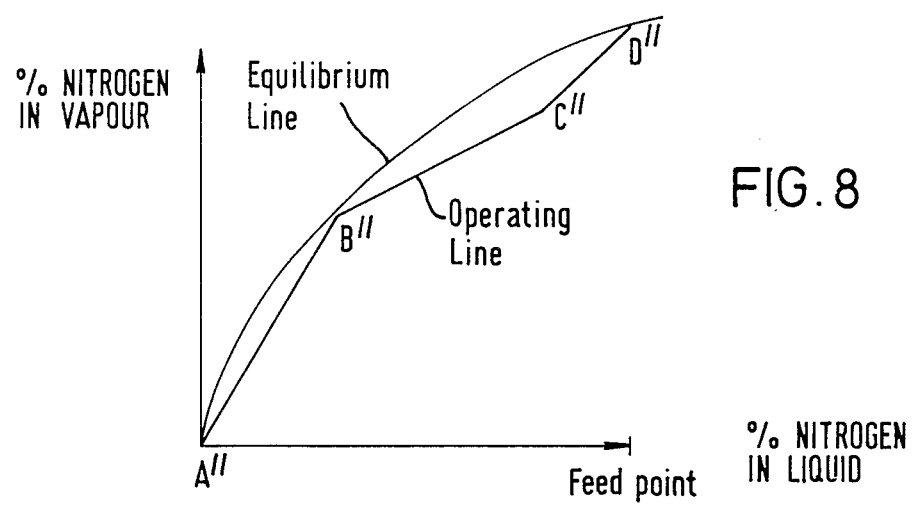
FIG. 8 is a further McCabe-Thiele diagram representing operation of the column shown in FIG. 7 to separate a binary mixture of oxygen and nitrogen.
Figure 9:
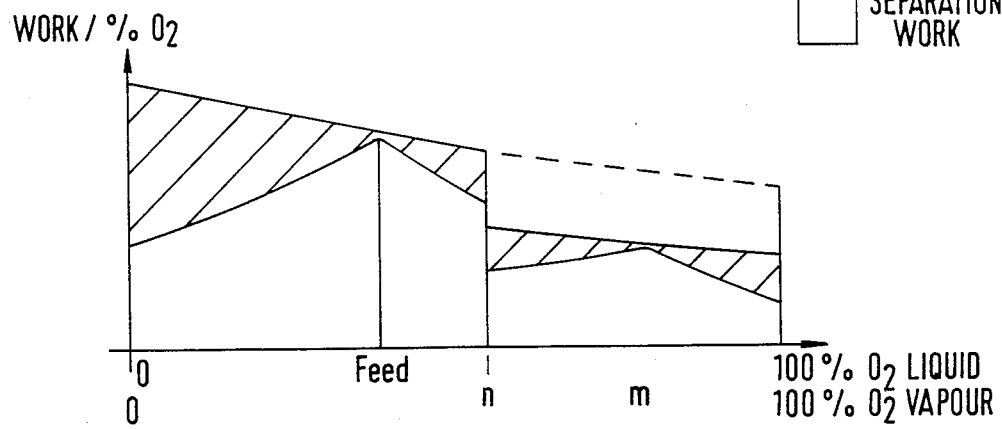
FIG. 9 is a graph representing the irreversibilities (excluding pressure drop) entailed in operating the column shown in FIG. 7 along the operating line A"B"C"D" of FIG. 8.

A primary advantage that the invention makes it possible to achieve is to enable different mass balance conditions to prevail in the column below the tray m from those occuring between the tray m and the tray n. Referring now to FIG. 8, line A"B"C"D" is the operating line. Length A"B" of this line passes through the origin and is the operating line for the part of the column below the tray m. Since different mass balance conditions prevail below the tray m from those that prevail above it, the length B"C" does not pass through the origin. Thus, the invention makes it possible to achieve a closer approach to absolute reversibility with the liquid for reboil being taken from the downcomer serving tray n and the resulting vapour being returned to the vapour space above tray m than is achieved when no such intermediate reboil is carried out even through in the latter case external heat may be applied to the tray n. The reduction in the amount of irreversible work of mixing that needs to be done when the column shown in FIG. 7 is operated is illustrated in FIG. 9 of the accompanying drawings which is to be compared with FIGS. 4 and 6. In particular, it can be seen that the irreversible work of mixing associated with the operation of the part of the column below the tray n is substantially reduced in comparison with operation of the column in accordance with FIGS. 5 and 6. The length C"D"of the operating line represents the section of the column shown in FIG. 7 between the tray n and the feed level. With an equilibrium line with a cunative as shown in FIG. 8, the line C"D"is kept relatively short. In other words, the tray n is relatively close to the feed level, though below such level, as aforesaid.

Generally, there will be a number of different positions available for the return of the reboiled vapor stream via the distributor 30 such that the composition of the vapor matches more closely that of the vapor leaving the liquid vapor on the tray m that it does the vapor in the vapor space above the tray n. It is not critical to the invention which one of these possible return positions is selected. (Indeed, it is possible for the vapor stream formed by intermediate reboil to be divided, with one part of it being returned to the column at one such position and the remainder being returned at one or more other such positions.) Each of these "matching" positions results in there being a relatively close proximity between the point "B" in FIG. 8, and the equilibrium line, and therefore, if selected for the returning reboiled liquid, makes it possible to keep down the amount of irreversible work of mixing that needs to be done. For a binary mixture, the position for such return is desirably selected so as to minimize the irreversible work that is done in the column. Irreversible work of mixing is not the sole source of such irreversible or lost work; there are also losses arising out of pressure drop in the column. In general, the greater the number of trays in the column, the greater the pressure drop. Accordingly, so far as distillation of ternary mixtures is concerned although in some instances it may be desirable to select the position of return of the reboiled liquid of intermediate composition so as to minimize the irreversible work, in other instances, it may be desirable to select a different return position so as to reduce the number of trays in the column needed to give a product or products of desired purity.

Figure 3:
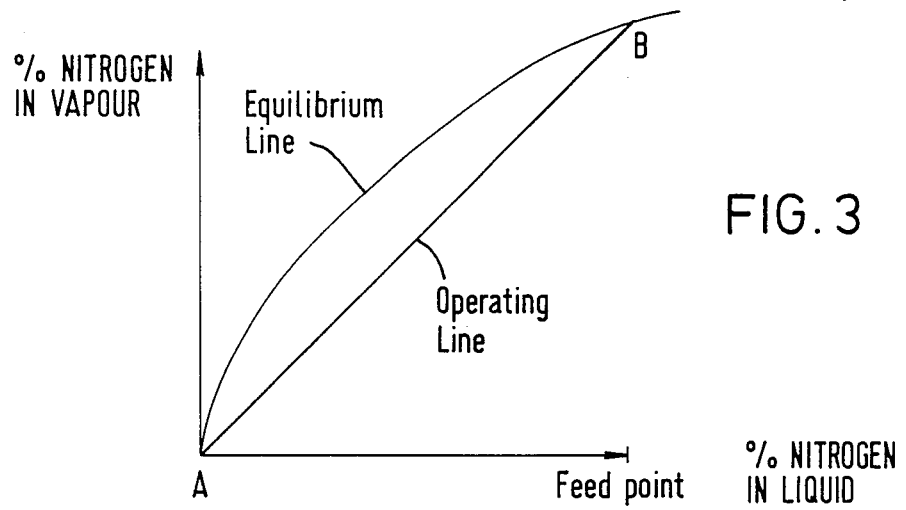
FIG. 3 is a McCabe-Thiele diagram representing operation of the column shown in FIG. 1 to separate a binary mixture of oxygen and nitrogen.
Figure 4:
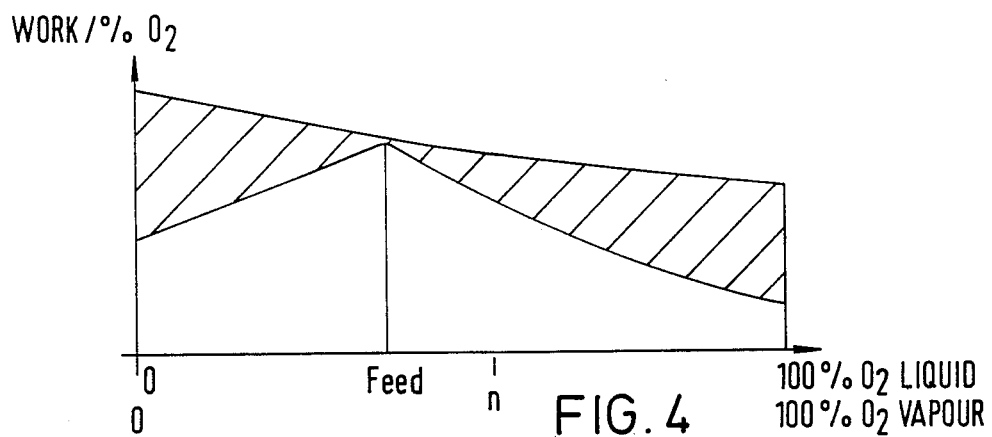
FIG. 4 is a graph representing the irreversibilities (excluding pressure drop) entailed in operating the column shown in FIG. 1 along the operating line AB in FIG. 3.
Figure 13:
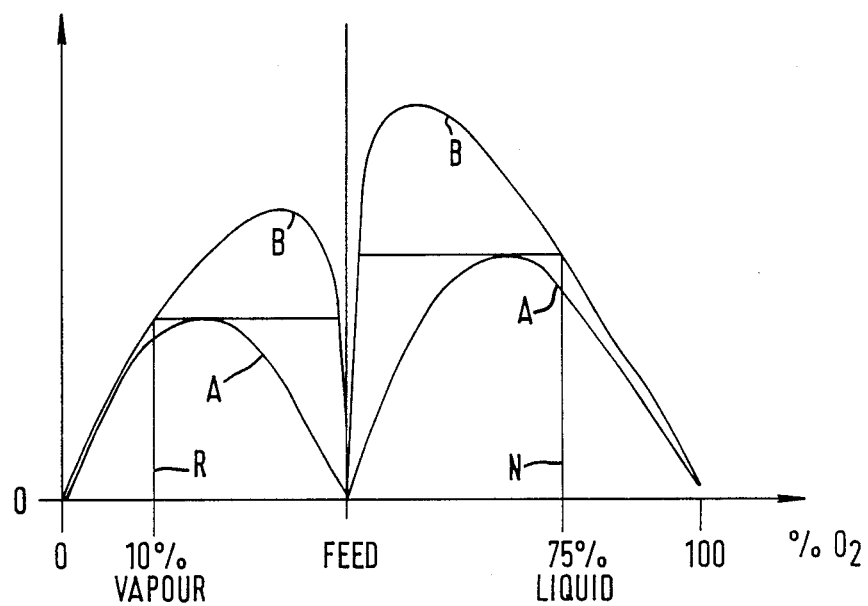
FIG. 13 is a graph showing by how much the irreversible (or "lost") work associated with operation of the column shown in FIG. 1 to separate a binary oxygen-nitrogen mixture can be reduced in accordance with the invention.

The part of FIG. 13 to the right of the feed point provides a schematic graphical illustration of the reduction in the amount of irreversible, or lost, work of mixing made possible by the invention for a binary oxygen-nitrogen system in comparison with operation of the column shown in FIG. 1 along the operting line of the McCabe-Thiele diagram in FIG. 3. FIG. 13 also provides a similar comparison operating line of FIG. 6. The abscissa of FIG. 13 has the same scales as the abscissa of FIGS. 4, 6 and 9. The part of curve B to the right of the feed part indicates how the size of the reduction in irreversible work of mixing that can be achieved varies with the composition of the liquid stream of intermediate composition taken for reboil. It is assumed for the purposes of FIG. 13 that no mixing losses occur at the position where the vapor formed by reboiling the liquid stream of intermediate composition is returned to the distillation column. FIG. 13 also ignores irreversibility resulting from pressure drop within the column. The part of curve A to the right of the feed point indicates how the size of the reduction in irreversible work that of mixing can be achieved varies with the position in the column in which auxiliary external heat is applied (i.e. the position of line B'C' in FIG. 5).

FIG. 13 shows that operation along the line A'B'C'D' of FIG. 5 cannot achieve a reduction in the amount of irreversible work less than that which is achievable by using the column shown in FIG. 7 to perform a single reboil in accordance with the invention. When the composition of the liquid selected for said reboil lies between the line N and the feed position on FIG. 13 the reduction is irreversible work is greater than anything that can be achieved with operation along the line A'B'C'D' in FIG. 5, irrespective of the position of the line B'C' in FIG. 5, that is irrespective of where the auxiliary heat is applied below the feed level of the column. It will be appreciated that tray n is preferably selected such that the composition of the liquid entering that tray corresponds to the maximum on the curve in FIG. 13 to the right of the feed point. The position of line N is at a liquid oxygen mole fraction of 0.75.

FIG. 13, to the left of the feed point, also illustrates that improved efficiency above the feed point can be achieved by operating an intermediate condenser in a manner analogous to the operation of the intermediate reboiler. Similar advantages can however be more simply achieved by introducing liquid air into the column in the event that it is the lower pressure column of a double column.

In the above description of the operation of the column shown in FIG. 7, the presence of argon has been ignored. Since argon constitutes less than 1% by volume of air, its presence in the oxygen-nitrogen mixture does to some extent affect the amount of lost work that can be saved in accordance with the invention (see FIG. 13) and the composition of the stream selected for intermediate reboil. In the event that argon is to be obtained as a product by taking a side draw (not shown in FIG. 7) of a mixture relatively rich in argon and subjecting the mixture to further distillation in another column (not shown in FIG. 7), the selection of the level in the column at which the reboiled liquid stream is returned is also influenced by the desirability of maximizing the yield of argon. Indeed, in some instances, this criterion may take priority over the other criteria affecting the selection of the return position. Thus, in order to increase argon yield, it may be desirable to select a return position where the irreversibility of the column is greater than could be achieved with a different return position. The selected return position will still be one where the composition of the reboiled liquid stream is a closer match to that of the vapor above the aforesaid tray m into which it is introduced by the distributor 30 (see FIG. 7) than it is to the composition of the vapor corresponding to the liquid passing onto the aforesaid tray (n−i) from which the liquid stream is taken for reboil in the heat exchanger 26. For mixtures comprising three or more components, the closeness of matching may be assessed by calculating the work involved in mixing the respective fluids, the less the calculated work, the closer the match.

In each of FIGS. 3, 5 and 8, the slope of the line AB indicates how much reboiled vapor is added at the bottom of the column. The greater the slope of this line, the lower is the volume of liquid reboiled at the bottom of the column, and hence the less the amount of heat required be provided for the reboiler 8. (See FIGS. 1 and 7 of the drawings). It can be seen that the slope of the line A" B" in FIG. 8 is greater than the slope of the line A'B' in FIG. 5, in which in turn is greater than the slope of the line AB in FIG. 3 and thus operation of the column in accordance with the invention involves the least amount of heating for the reboiler at the bottom of the column. Moreover, the amount of work required to provide reboil in the reboiler 8 and the heat exchanger 26 of the column shown in FIG. 7 is less than the amount of work required to provide reboil for the column shown in FIG. 1 whether it is operated along the line AB in FIG. 3 or the line A'B'C'D' in FIG. 5.

Referring again to FIG. 8 it will be appreciated that a further reduction in the quantity of reboil required for the reboiler 8 may be effected by making a second withdrawal of liquid at a level below the tray m and reboiling the liquid with the reboiled vapor being returned further down the column to a position at which the composition of the vapor into which it is returned matches the composition of this reboiled stream more closely than that of the vapor passing out of mass-exchange relationship with the liquid from which said second liquid stream is taken for reboil. However, the amount of advantage to be obtained will be proportionately less than that obtained when just a single stream of intermediate composition is taken for reboil and it is generally preferred not to perform such a second intermediate reboil.

It is not essential to effect the reboil of the stream of intermediate composition as it flows through a heat exchange of the kind shown by the reference in FIG. 7. It is alternatively possible to use a conventional kind of reboiler in which the heat exchange fluid is passed through a heat exchange coil immersed in a reservoir of the liquid to be reboiled. If desired, such a reboiler may be of the thermo-siphon kind.

Figure 10:
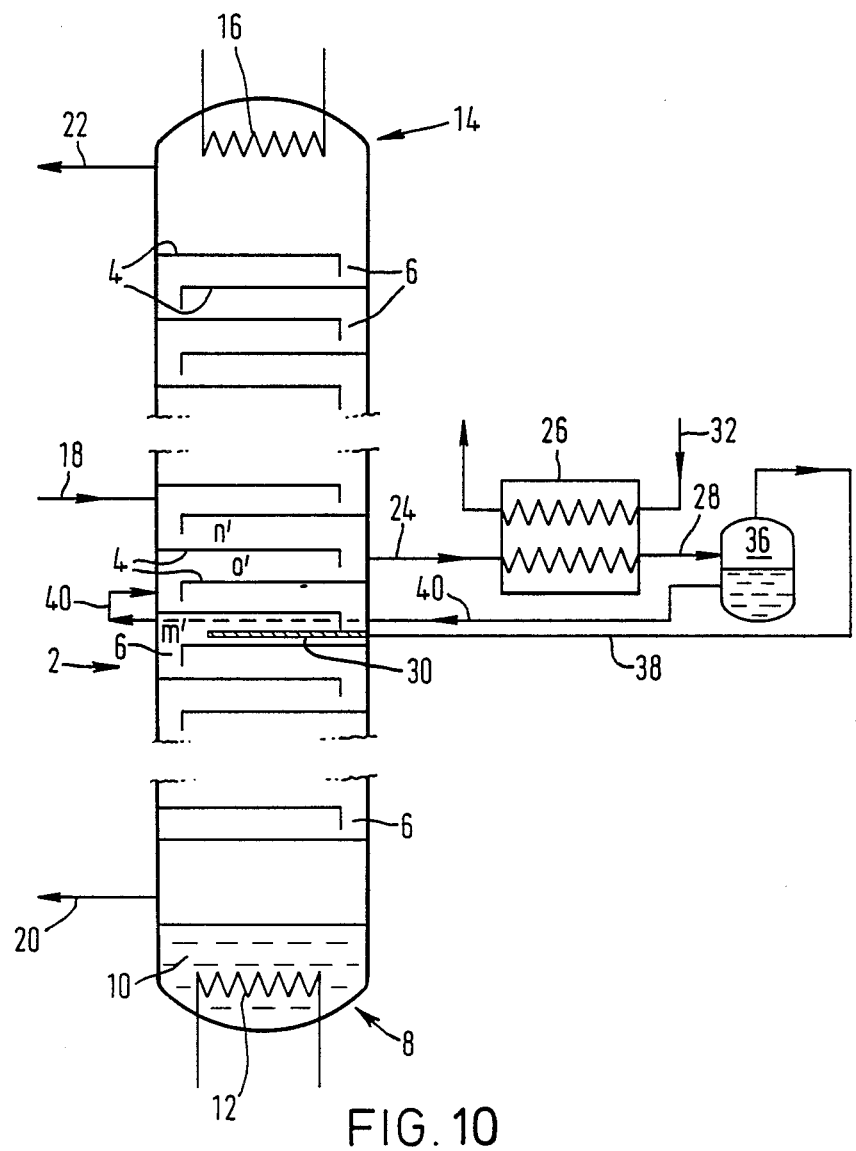
FIG. 10 is a schematic diagram illustrating an alternative embodiment of the column shown in FIG. 7.

It is not necessary to convert into vapor all the stream of intermediate composition taken for reboil. In FIG. 10 of the drawings, there is shown an alternative embodiment of the invention in which not all the liquid taken for reboil in the heat exchanger 26 is converted to the vapor phase. Thus, the outlet of the first pass of the heat exchanger communicates via a conduit 28 with a phase separator 36 in which the vapor is disengaged from the residual liquid. Since not all the liquid is reboiled, the heat necessary to effect such reboiling as does take place is supplied over a smaller temperature range ending at a lower temperature than when all the liquid is reboiled.

In FIG. 10, the liquid for reboil in the heat exchanger 26 is taken from the same level of the column as in FIG. 7. Vapor from the phase separator 36 is returned via conduit 38 to a distributor 30 positioned in the vapor space above tray m'. Residual liquid is taken from the phase separator 36 via conduit 40 and introduced into the liquid leaving tray o'. Tray m' is positioned below tray n and tray o' is typically positioned intermediate trays n and m'. The selection of these trays is such that the composition of the vapor introduced into the vapor phase above tray m' matches more closely the composition of the vapor leaving the surface of the liquid on tray m' than it does the composition of the vapor above tray n and such that the composition of the liquid leaving tray o' from the conduit 40 matches more closely the composition of the liquid on that tray than it does the composition of the liquid on tray n'. In general, there will be more than one tray available for selection as m' and more than one tray available for selection as o'. The criteria for selecting which of these trays to select as m' and o' are analogous to those discussed above with respect to the operating of the column shown in FIG. 7. If desired, the phase separator 36 may be omitted, and the liquid vapor mixture from the heat exchanger 26 may be returned to a chosen tray in accordance with the invention.

Two plant for producing oxygen, nitrogen and argon utilizing the principle discussed above will now be described with reference to FIGS. 11 and 12 of the accompanying drawings.

Figure 11:
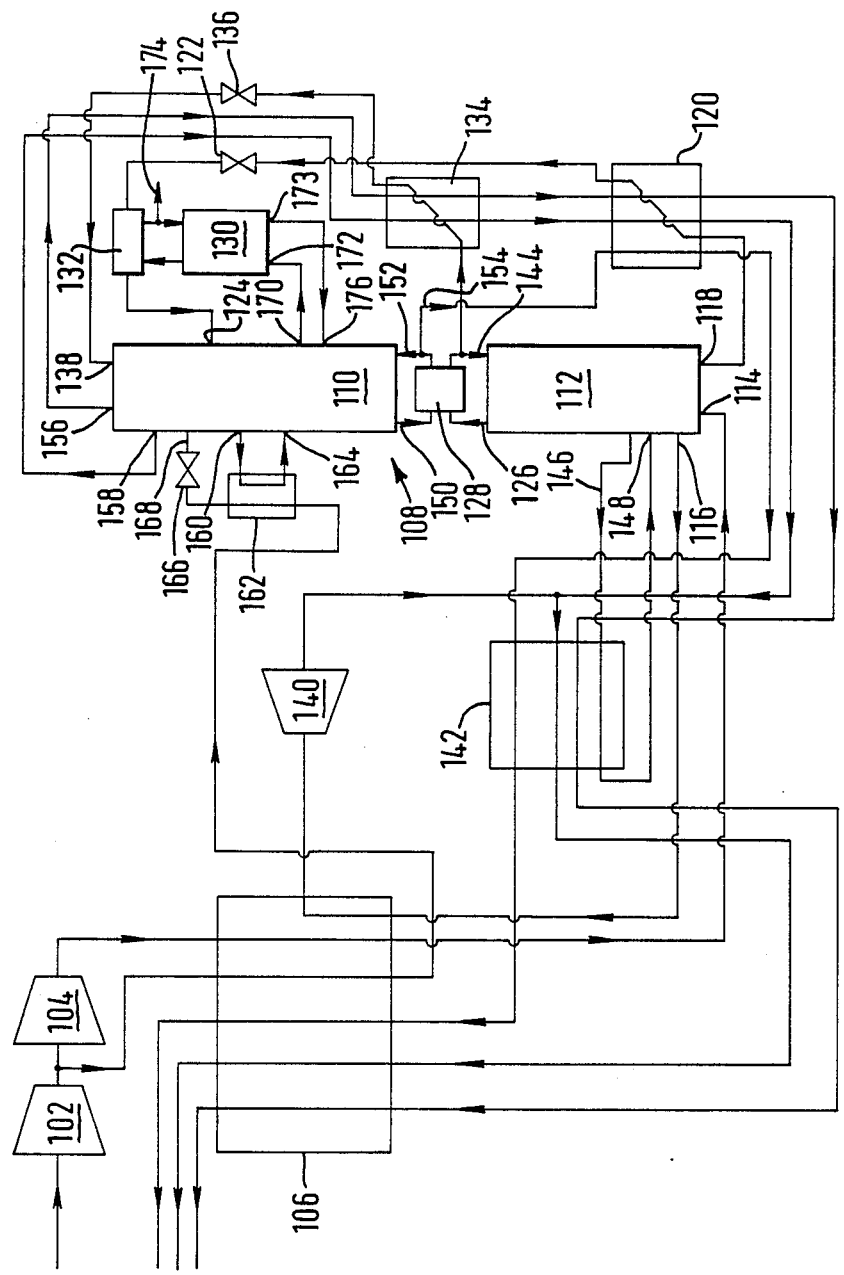
FIG. 11 is a schematic drawing illustrating a first air separation plant in accordance with the invention utilizing the principle of reboiling a liquid stream of intermediate composition.

Referring to FIG. 11 of the accompanying drawings, an air stream at ambient temperature and pressure is compressed by a first compressor 102 to a pressure of about 1.8 atmospheres. The air stream is then divided into two. The major part of the stream is compressed in compressor 104 to a pressure of about 6.8 atmospheres and is then passed at a temperature of about 293 K. into the warm end of a reversing heat exchanger 106 in which it is cooled to a temperature of about 104 K. The minor part of the air stream at a pressure of about 1.8 atmospheres is passed at a temperature of about 293 K. into the warm end of a reversing heat exchanger 106 and is cooled cocurrently with the said major part of the air, leaving the heat exchanger 106 at a temperature of about 104 K. In a manner well known in the art, the reversing heat exchanger 106 is effective to remove carbon dioxide and water vapor from the air streams.

The major air flow passes from the reversing heat exchanger 106 into the higher pressure column 112 of a double column indicated generally by the reference numeral 108, through an inlet 114 (at a level below that of the lowest tray (not shown) of the column 112. A portion of the air is immediately withdrawn from the column 112 through outlet 116 and is returned to the cold end of the reversing heat exchanger 106 at a temperature of about 104 K. This air stream flows through the heat exchanger 106 countercurrently to the aforesaid minor and major air flows. It is withdrawn from an intermediate location of the heat exchanger 106 at a temperature of about 184 K. and is then expanded with the performance of external work in an expansion turbine 140. The air leaves the turbine 140 at a temperature about 124 K. and a pressure of about 1.25 atmospheres. The expanded air is mixed with an impure or waste nitrogen stream from the low pressure column 110 and is then introduced at a temperature of about 106 K. into a suitable system of heat exchangers indicated generally by the reference 142. The waste nitrogen-air mixture leaves the heat exchanger system 142 at a temperature of about 102 K. and then flows back through the reversing heat exchanger 106 from the cold end to the warm end thereof, and is then vented to the atmosphere. If desired, instead of taking an air stream out of the column 112 through the outlet 116 and returning it partially through the heat exchanger 106 prior to expanding it in the turbine 140, the air for the turbine 140 may be taken directly from the major air flow at an intermediate region of the heat exchanger 106.

In the higher pressure column 112, the air is separated at a pressure of about 6 atmospheres into an oxygen-rich liquid and a nitrogen vapor fraction. The oxygen-rich liquid is used as the main feed for the lower pressure column 110 which is employed to separate the liquid to produce a substantially pure oxygen product, a substantially pure nitrogen product, and an argon-enriched air stream which is separated in a further column 130, operating at substantially the same pressure as the column 110, to form a substantially pure argon product. The oxygen-rich liquid is withdrawn from the bottom of the column 112 through an outlet 118. It is then sub-cooled in a heat exchanger 120 which it enters at a temperature of about 97 K. The sub-cooled liquid then passes through a throttling valve 122 which is effective to reduce its pressure to approximately the operating pressure of the lower column 110. The liquid is then passed through a condenser 132 associated with the argon column 130. The liquid boils in the condenser 132 and the resulting oxygen-rich air liquid vapor mixture is introduced into the lower pressure column 110 through an inlet 124.

Liquid nitrogen reflux for the column 110 is provided by withdrawing nitrogen from the top of the column 112 through an outlet 126, condensing it in a condenser-reboiler 128 which provides a thermal link between the columns 110 and 112, and taking part of the condensate, at a temperature of about 93 K., and sub-cooling it to a temperature of about 81 K. by heat exchange in a heat exchanger 134. The sub-cooled liquid nitrogen is then passed through throttling valve 136 and is introduced into the top of the column 110 through an inlet 138. The remainder of the nitrogen condensate is returned to the higher pressure column 112 a reflux through the inlet 144. In order to reduce the temperature of the minor part of the air stream leaving the reversing heat exchanger, some liquid is withdrawn from the higher pressure column 112 through outlet 146, is reboiled in heat exchanger system 142, and is returned to the higher pressure column 112 through the inlet 148. Referring again to the lower pressure column 110, the liquid reflux becomes progressively richer in oxygen as it descends the column 110, and an ascending vapor stream becomes progressively richer in nitrogen. Reboil is provided for the column 110 by withdrawing a stream of liquid oxygen from the bottom of the column through an outlet 150 boiling it in the condenser-reboiler 128 and returning a part the resulting vapor at a pressure of about 1.5 atmospheres to the bottom of the column through an inlet 152. The remainder of the boiled oxygen vapor is taken as product through a conduit 154 at a temperature of about 96 K., and is warmed to a temperature of about 101 K. by flow through the heat exchanger 120 countercurrently to the oxygen-rich liquid withdrawn from the bottom of the column 112, and is then further warmed to a temperature of about 102 K. by passage through the heat exchanger system 142. The oxygen product stream, which is typically 99.8% pure, is then passed through the reversing heat exchanger 106 countercurrently to the incoming air flow, and is thereby warmed to a temperature of about 293 K.

A gaseous nitrogen product stream is taken from the top of the lower pressure column 110 through an outlet 156 at a temperature of about 79 K. and a pressure of about 1.25 atmospheres. The nitrogen product stream is first warmed in heat exchanger 134 flowing countercurrently to the nitrogen stream taken from the condenser-reboiler 128, and leaves the heat exchanger 134 at a temperature of about 95 K. It is then warmed to a temperature of about 101 K. by passage through the heat exchanger 120 cocurrently with the oxygen product stream, and then to about 102 K. by passage through the heat exchanger 142, also cocurrently with the product oxygen stream. The product nitrogen is then warmed to about 293 K. by passage through the reversing heat exchanger 106 countercurrently to the incoming air flow.

In order to provide a waste nitrogen stream which may be used to cleanse the reversing heat exchanger in a manner well known in the art by subliming solid, frozen deposits of water and carbon dioxide, impure nitrogen typically containing about 50 volumes per million by volume of oxygen is withdrawn from the column 110 at a level a few trays below the uppermost tray in the column. The waste nitrogen stream is withdrawn at a temperature of about 79 K. through an outlet 158 and then passed through the heat exchangers 134 and 120, in sequence, cocurrently with the product nitrogen stream. The waste nitrogen stream is then united with the expanded air stream and passed through the heat exchangers 142 and 106 as hereinbefore described.

In accordance with the invention, the efficiency with which the column 110 operates is enhanced by withdrawal of a liquid stream containing about 25% by volume of $O_2$, ie a liquid stream of intermediate composition and at a temperature of about 82.5 K., from the column through an outlet 160 at a level below that of the oxygen-enriched air inlet 124, and reboiling of the withdrawn liquid in a condenser-reboiler 162. The resulting vapor is returned to the column through an inlet 164 at a level below that of the outlet 160 chosen such that the composition of the resulting vapor matches the composition of the vapor into which it is returned more closely than that of the vapor out of mass exchange relationship with which the liquid is taken for reboil through the outlet 160.

Heating for the condenser-reboiler 162 is provided by passing the aforesaid minor flow of incoming air that exits the cold end of the reversing heat exchanger 106 through the condenser-reboiler 162 countercurrently to the liquid stream of intermediate composition, the minor flow of air thereby being condensed. The resulting condensed air is passed through a throttling valve 166 and is then introduced into the column 110 through an inlet 168 at a level below that of the outlet 158 but above that of the inlet 124.

In effect, the amount of air that is able to be processed by the double column 108, is increased by virtue of the net air introduced into the column 110 through the inlet 168. Typically, the ratio of the air flow rate entering the column 112 through the inlet 114 to the air flow rate entering the column 110 through the inlet 168 is in the order of 15 to 1, ie an extra 6 to 7% of air is processed in the double column 108. (the net air flow rate equals the flow into the column 112 through inlet 114 minus the flow outh through outlet 116).

Moreover, by arranging for the extra air to be introduced into the column 110 in the liquid state, the liquid-vapor ratio in the column 110 is enhanced, and we have found that such enhancement of the liquid-vapor ratio facilitates the production of argon such that the flow rate and purity at which argon product is produced remains substantially unimpaired. By introducing the liquid air into the column 110 through the inlet 168, a net downward flux of argon is maintained such that a maximum concentration of argon in the vapor phase obtains in the column at a level below that of inlet 164, and at such level an outlet 170 for argon-enriched oxygen is located. Argon-enriched air vapor is withdrawn through the outlet 170 and is passed into the column 130 through an inlet 172. In the column 130m the argon-enriched oxygen is separated into substantially pure argon and an oxygen-rich liquid. Reflux for the column 130 is provided by condensing vapor taken from the top thereof in the condenser 132, and returning a portion of the condensate to the top of the column, while withdrawing the remainder of the condensate through conduit 174 as product argon. Cooling for the condenser 132 is provided by the oxygen-rich liquid withdrawn from the bottom of the column 112 through the outlet 118, as aforesaid. Oxygen-rich liquid that collects at the bottom of the column 130 is withdrawn therefrom through an outlet 173, and is returned to the column 110 through an inlet 176 below the level of the outlet 170.

Figure 12:
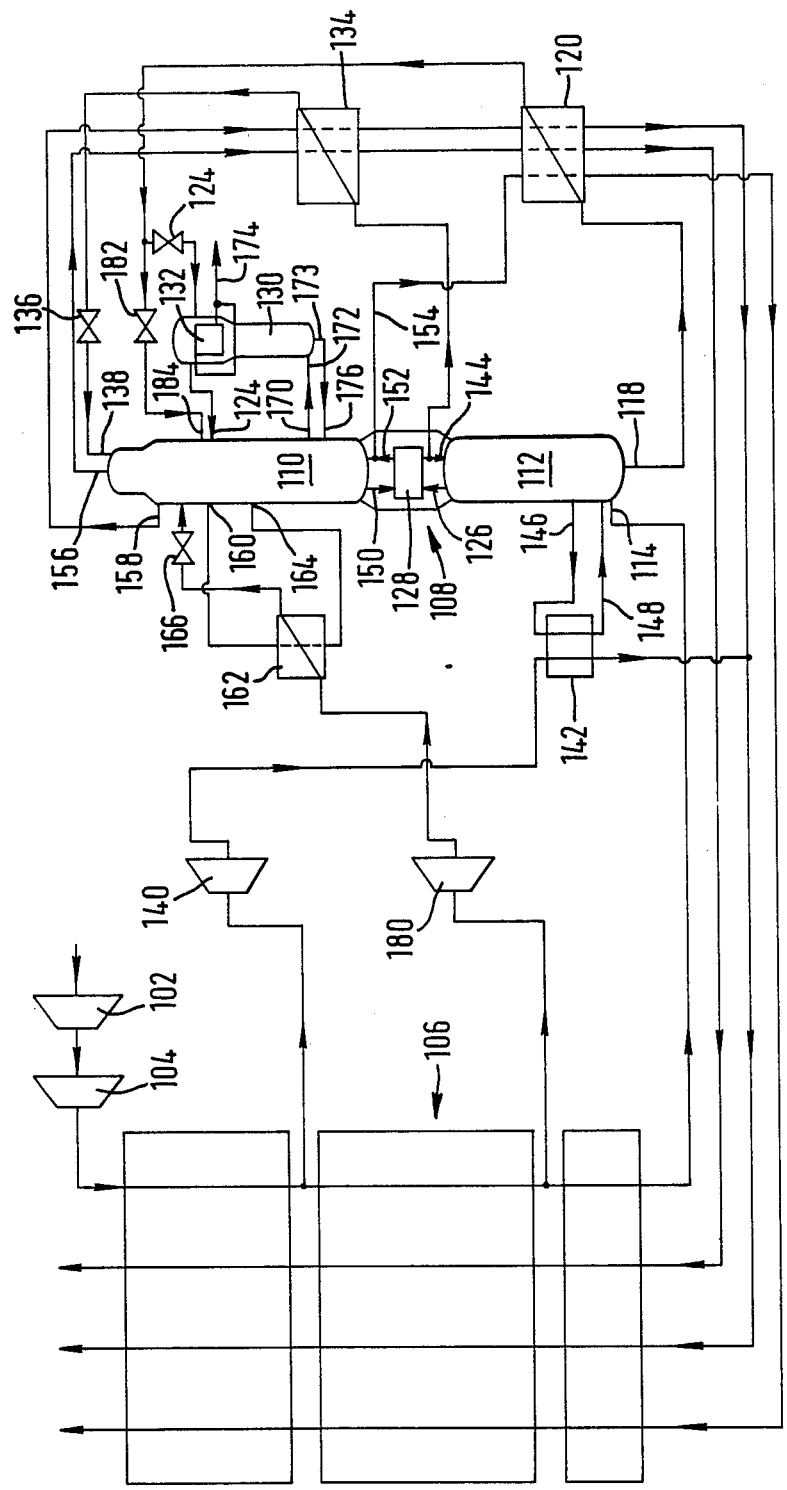
FIG. 12 is a schematic drawing illustrating an alternative plant, in accordance with the invention, to that shown in FIG. 11.

The plant shown in FIG. 12 of the accompanying drawings is generally similar to the one shown in FIG. 11. The major difference between the two plants is that the air stream introduced into the lower pressure column 110 through the inlet 168 is taken from the incoming air downstream of the compressor 104 and is then expanded upstream of its heat exchange with the liquid stream of intermediate composition. Thus, no minor flow of air is taken from intermediate the compressors 102 and 104.

In the plant shown in FIG. 12, therefore, one minor flow of air is withdrawn from an intermediate region of the reversing heat exchanger 104 at a temperature of about 123 K. and is expanded in an expansion turbine 180 to a pressure of 1.55 atmospheres and a temperature of about 86 K. (i.e. its dew point) prior to its passage through the heat exchanger 162. An advantage of this arrangement is that it makes possible a reduction in the rate at which air needs to be passed to the turbine 140. In the plant shown in FIG. 11, the ratio of the flow rate of air out of the compressor 104 to the flow rate of air into the turbine 140 is about 7.5 to 1, whereas in operation of the plant shown in FIG. 12 this ratio may be increased to about 24 to 1. The extra air flow for processing may be expanded in the turbine 180 such that in operation of the plant shown in FIG. 12 the ratio of the flow rate of air into the plant through the inlet 114 to that through the inlet 168 may be about 9:1, without reducing the net flow rate of air into the higher pressure column.

Other differences between the plants shown in FIGS. 11 and 12 are that the air for mixing with the waste nitrogen stream is in the plant shown in FIG. 12 is taken directly from an intermediate temperature location of the heat exchanger 106 and not from the column 112; in the plant shown in FIG. 12 the air stream from the turbine 140 is united with the waste nitrogen stream downstream of the heat exchanger 142 (the waste nitrogen not passing through the turbine 140); the oxygen and nitrogen product streams are not passed through the heat exchanger system 142 of the plant shown in FIG. 12 but pass directly from the heat exchanger 120 to the cold end of the heat exchanger 106; and in the plant shown in FIG. 12 a portion of the oxygen-rich liquid is taken from intermediate the valve 122 and the cold end of the heat exchanger 120, is passed through a throttling valve 182 and is introduced into the column 110 through inlet 184 as liquid at a level above that of the outlet 160.

Various changes may be made to the plant shown in FIG. 12. For example, the air streams to the turbines 140 and 180 may be taken from a single point. Typically, this expedient will have the result that the air entering the heat exchanger 162 will be above its dew point. However, if desired, the air stream may downstream of the turbine 140 be passed through the heat exchanger 142 cocurrently with the other streams passing therethrough in order to reduce its temperature to the dew point and then passed into the heat exchanger 162 in order to reboil the liquid stream of intermediate composition.

I claim:

1. A method of distilling air in at least one liquid-vapor contact column in which a boiling liquid phase comprising a mixture of oxygen, nitrogen and argon is contacted intimately and undergoes mass exchange with a condensing vapor phase comprising oxygen, nitrogen and argon, said method including the steps of:
   (i) providing reboil at a bottom region and reflux at a top region of a first liquid-vapor contact column
   (ii) taking from a chosen level in the first column at least one liquid stream out of mass exchange relationship with vapor, said stream having a composition intermediate the extremes of composition that obtain in the column;
   (iii) heat exchanging said at least one liquid stream of intermediate composition with a heat exchange fluid in a region external to the column so as to boil at least part of the stream, said heat exchange fluid flowing along a path other than one in which it passes directly from one liquid-vapor contact column, undergoes phase change in heat exchange relationship with said liquid stream of intermediate composition and returns directly to the same column; and
   (iv) returning at least one stream of the boiled liquid to said first column or another liquid-vapor contact column;
   wherein:
      the composition of the said returning stream matches more closely the composition of vapor at or adjacent the column level where said stream is returned than it does the composition of the vapor in mass exchange relationship with the liquid at said chosen level from which said at least one liquid stream is taken.

2. A method according to claim 1, in which a single liquid stream of intermediate composition is taken for vaporization from said first column.

3. A method according to claim 1, in which the air is separated in a double column comprising lower and higher pressure columns and the said liquid stream of intermediate composition is taken from the lower pressure column and is returned thereto after being boiled.

4. A method according to claim 1, in which said liquid stream of intermediate composition taken from a chosen level of said first column comprises from 20 to 50% by volume of the liquid flow at that level.

5. A method according to claim 1, in which the boiling of said liquid stream of intermediate composition is incomplete and the resulting vapor is separated from the residual liquid upstream of its return to the first column.

6. A method according to claim 1, in which the residual liquid is subjected to further heat exchange in order to complete its boiling.

7. Apparatus for distilling air, comprising a first liquid vapor contact column in which, in use, a boiling liquid phase comprising oxygen, nitrogen and argon is contacted intimately and undergoes mass exchange with a condensing vapor phase comprising oxygen, nitrogen and argon, said first column having at least one outlet passage at a chosen level for the withdrawal of a liquid stream of composition intermediate the extremes of composition that obtain in the column, in use, and communicating with heat exchange means operable to boil at least part of said stream by heat exchange with heat exchange fluid, wherein the said heat exchange means is external to the column and is in communication with said column or another liquid vapor contact column at a level such that a stream of boiled liquid mixes with vapor and such that the composition of the returning stream matches more closely the composition of the vapor with which it is mixed, in use, than it does the composition of the vapor in mass exchange with the liquid at said chosen level, there being a path for the flow of said heat exchange fluid, other than one in which, in use, the heat exchange fluid passes directly from one liquid-vapor contact column, undergoes phase change in heat exchange relationship with said intermediate composition stream, and returns directly to the same column.

8. Apparatus according to claim 7, in which there is no outlet from said first column in communicatin with said heat exchange means.

9. Apparatus according to claim 7, in which said first column is the lower pressure column of a double column comprising higher and lower pressure columns, and said path extends from a source of air and terminates in an inlet to said lower pressure column above said outlet for the liquid stream of intermediate composition.

10. Apparatus according to claim 9, in which said path includes an expansion turbine intermediate said air source and said heat exchanger means.

11. Apparatus according to claim 9, in which said path includes a valve intermediate said heat exchange means and said inlet to the lower pressure column.

* * * * *

UNITED STATES PATENT AND TRADEMARK OFFICE
CERTIFICATE OF CORRECTION

PATENT NO. : 4,843,828
DATED : July 4, 1989
INVENTOR(S) : David C.F. Gladman

It is certified that error appears in the above-identified patent and that said Letters Patent is hereby corrected as shown below:

Column 8, line 24, "(n-i)" should read --(n-1)--;

Column 12, line 34, the numeral --26-- should be inserted between "reference" and "in";

Column 18, line 37, "communicatin" should be --communication--.

Signed and Sealed this

Third Day of September, 1991

Attest:

HARRY F. MANBECK, JR.

*Attesting Officer*         Commissioner of Patents and Trademarks

UNITED STATES PATENT AND TRADEMARK OFFICE
CERTIFICATE OF CORRECTION

PATENT NO. : 4,843,828

DATED : July 4, 1989

INVENTOR(S) : David C.F. Gladman

It is certified that error appears in the above-identified patent and that said Letters Patent is hereby corrected as shown below:

Claims 3, 9, 10 and 11 should be deleted.

Signed and Sealed this

Tenth Day of December, 1991

*Attest:*

HARRY F. MANBECK, JR.

*Attesting Officer*       *Commissioner of Patents and Trademarks*